United States Patent
Johnson et al.

(10) Patent No.: US 9,578,961 B1
(45) Date of Patent: Feb. 28, 2017

(54) DISPLAY SHELF FOR ELECTRICALLY POWERED CONSUMER PRODUCTS

(71) Applicant: Target Brands, Inc., Minneapolis, MN (US)

(72) Inventors: Jason W. Johnson, Wayzata, MN (US); Erin L. Zobel, Minneapolis, MN (US); Timothy J. Martell, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 14/824,634

(22) Filed: Aug. 12, 2015

(51) Int. Cl.
| | |
|---|---|
| *A47B 21/06* | (2006.01) |
| *A47B 96/02* | (2006.01) |
| *A47F 5/00* | (2006.01) |
| *H01R 25/00* | (2006.01) |
| *H01R 27/02* | (2006.01) |

(52) U.S. Cl.
CPC ............. *A47B 21/06* (2013.01); *A47B 96/021* (2013.01); *A47F 5/0043* (2013.01); *H01R 25/006* (2013.01); *H01R 27/02* (2013.01); *A47B 2021/066* (2013.01)

(58) Field of Classification Search
CPC . A47B 21/06; A47B 96/021; A47B 2021/066; A47B 2200/0082; H01R 27/02; H01R 25/006; A47F 5/0043; A47F 2200/0082; A47F 5/01; H02G 3/18
USPC .......................................................... 211/26
See application file for complete search history.

(56) References Cited

U.S. PATENT DOCUMENTS

| | | | |
|---|---|---|---|
| 1,270,718 A | 6/1918 | Ford | |
| 4,074,635 A | 2/1978 | Stauble | |
| 4,198,913 A * | 4/1980 | Haworth | A47B 96/061 108/108 |
| D267,059 S | 11/1982 | Thompson | |
| 4,372,629 A * | 2/1983 | Propst | A47B 21/06 248/52 |
| D274,105 S | 6/1984 | Brescia et al. | |
| D284,630 S | 7/1986 | Ferdinand | |
| 4,792,881 A | 12/1988 | Wilson et al. | |
| 5,230,552 A * | 7/1993 | Schipper | A47B 21/06 108/26 |
| 5,231,562 A * | 7/1993 | Pierce | A47B 21/06 108/50.02 |
| 5,617,797 A | 4/1997 | Casey | |
| 6,028,267 A * | 2/2000 | Byrne | H01R 13/518 174/55 |
| D443,163 S | 6/2001 | Welch | |
| 6,254,206 B1 * | 7/2001 | Petrick | A47B 21/06 108/50.02 |

(Continued)

*Primary Examiner* — Korie H Chan
(74) *Attorney, Agent, or Firm* — Leanne Taveggia Farrell; Westman, Champlin & Koehler, P.A.

(57) ABSTRACT

A display includes a shelf having an elongated slot for receiving a power cord of at least one electrically powered consumer product being displayed on the shelf in front of the elongated slot. The elongated slot is defined by a portion of a free edge of a rotatable door that covers a pocket in a closed position and by a back end of a table having an upper surface for supporting the electrically powered consumer products. Remaining portions of the free edge of the rotatable door engage with a lip that protrudes from a front wall of the pocket so that a top side of the rotatable door is in alignment with the upper surface of the table when the rotatable door is in the closed position.

20 Claims, 8 Drawing Sheets

(56) References Cited

U.S. PATENT DOCUMENTS

| | | |
|---|---|---|
| 6,397,762 B1 | 6/2002 | Goldberg et al. |
| 6,499,608 B1 * | 12/2002 | Sterling .............. A47B 96/027 |
| | | 211/70.1 |
| 6,578,498 B1 | 6/2003 | Draudt et al. |
| 6,732,661 B2 * | 5/2004 | Grasse .................. A47B 21/06 |
| | | 108/50.02 |
| D495,720 S | 9/2004 | Avalos Barcenas et al. |
| 6,802,577 B2 | 10/2004 | Gershfeld |
| D500,225 S | 12/2004 | Suero, Jr. |
| 7,312,393 B2 | 12/2007 | McCarthy |
| D568,648 S | 5/2008 | Roussel et al. |
| D607,020 S | 12/2009 | Baacke et al. |
| D628,833 S | 12/2010 | Giles et al. |
| 7,966,951 B1 | 6/2011 | Black et al. |
| D660,059 S | 5/2012 | Nilsson |
| 8,295,036 B2 | 10/2012 | Byrne |
| 8,360,373 B2 | 1/2013 | Johnson et al. |
| D694,046 S | 11/2013 | Walter |
| 8,664,527 B2 | 3/2014 | Ruotsala |
| 8,689,705 B2 | 4/2014 | Martin et al. |
| 8,925,469 B2 | 1/2015 | Bennie et al. |
| D724,876 S | 3/2015 | Gokhale et al. |
| D764,834 S | 8/2016 | Citterio |
| 9,468,312 B2 | 10/2016 | Denby |
| 2003/0189393 A1 | 10/2003 | Draudt et al. |
| 2015/0292794 A1 | 10/2015 | Bienick |

* cited by examiner

DISPLAY SHELF FOR ELECTRICALLY POWERED CONSUMER PRODUCTS

BACKGROUND

Retail stores use a variety of display fixtures to present products to customers for purchase. These display fixtures can support the product, indicate the product price and include signage and graphics for highlighting the product. Exemplary display structures include shelves, trays, racks, peg hooks and other similar structures.

The discussion above is merely provided for general background information and is not intended to be used as an aid in determining the scope of the claimed subject matter.

SUMMARY

A display is mounted to a gondola display unit and includes a shelf having an elongated slot for receiving a power cord of at least one electrically powered consumer product being displayed on the shelf in front of the elongated slot. The elongated slot is defined by a portion of a free edge of a rotatable door that covers a pocket in a closed position and by a back end of a table having an upper surface for supporting the electrically powered consumer products. Remaining portions of the free edge of the rotatable door engage with a lip that protrudes from a front wall of the pocket so that a top side of the rotatable door is in alignment with the upper surface of the table when the rotatable door is in the closed position.

A display shelf includes a table, a trough, a door and a lip. The table has an upper surface for displaying at least one electrically powered consumer product and a back end. The trough has a front wall, a bottom wall and a back wall and is defined between the back end of the table and the back wall of the trough. The bottom wall of the trough is located below the upper surface of the table. The door has right and left side edges, a fixed edge rotatably coupled to a top of the back wall of the trough, a free edge and a top side. The free edge includes a first linear portion spaced from the fixed edge by a first distance, a second linear portion spaced from the fixed edge by a second distance that is less than the first distance and a third linear portion spaced from the fixed edge by the first distance. The lip protrudes from the front wall of the trough and engages with the free edge of the door along the first linear portion and the third linear portion when the door is in a closed position. The top side of the door is in alignment with the upper surface of the table when the door is in the closed position so that between the back end of the table and the second linear portion of the free edge of the door there is an elongated slot in the display shelf for receiving a power cord from the at least one electrically powered consumer product displayed on the table.

A method of displaying electrically powered consumer products is provided. At least one electrically powered consumer product is set on an upper surface of a table of a display shelf. The at least one electrically powered consumer product includes a power cord. The power cord of the at least one electrically powered consumer product is plugged into a power strip located in a trough behind the table. The trough is defined by a front wall, a bottom wall and a back wall and wherein the bottom wall of the trough is located below the upper surface of the table. A rotatable door is shut that covers a portion of the trough so that portions of a free edge of the rotatable door engage with a lip that protrudes from the front wall of the trough so that a top side of the rotatable door is in alignment with the upper surface of the table and a remaining portion of the free edge of the rotatable door defines an elongated slot for the power cord to pass into the trough.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

When electrically powered consumer products are displayed in a retail store, their power cord is often connected to an electrical power source so that the product is displayed in its operational state. For example, lamps are often displayed with their power on. Displaying these products in this way is challenging because of the need for providing a power source in what may be the center of a store floor and also the need for power cord management without detracting from the consumer products on display. As described in detail below, a display shelf is provided for mounting to uprights of a gondola display unit. The display shelf includes a trough enclosed by a door that holds one or more power strips for powering consumer products displayed on the display portion and components for managing the power cords from the consumer products that are displayed. The door that encloses the trough fits seamlessly with the table portion so as to mask the existence of the trough.

Figure 1:
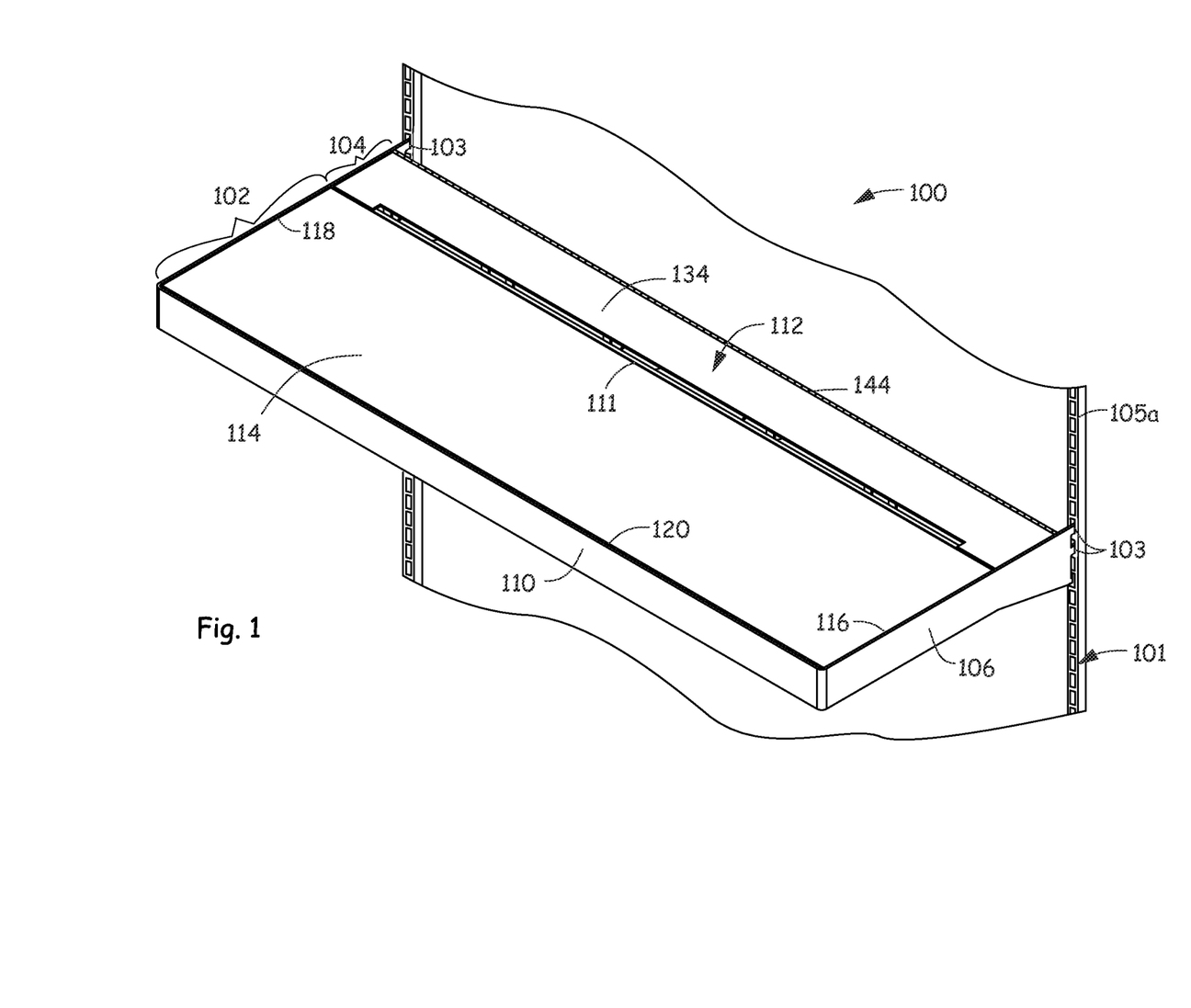
FIG. 1 is a perspective view of a display shelf attached to a gondola display unit where a door of a trough is in a closed position according to one embodiment.
Figure 2:
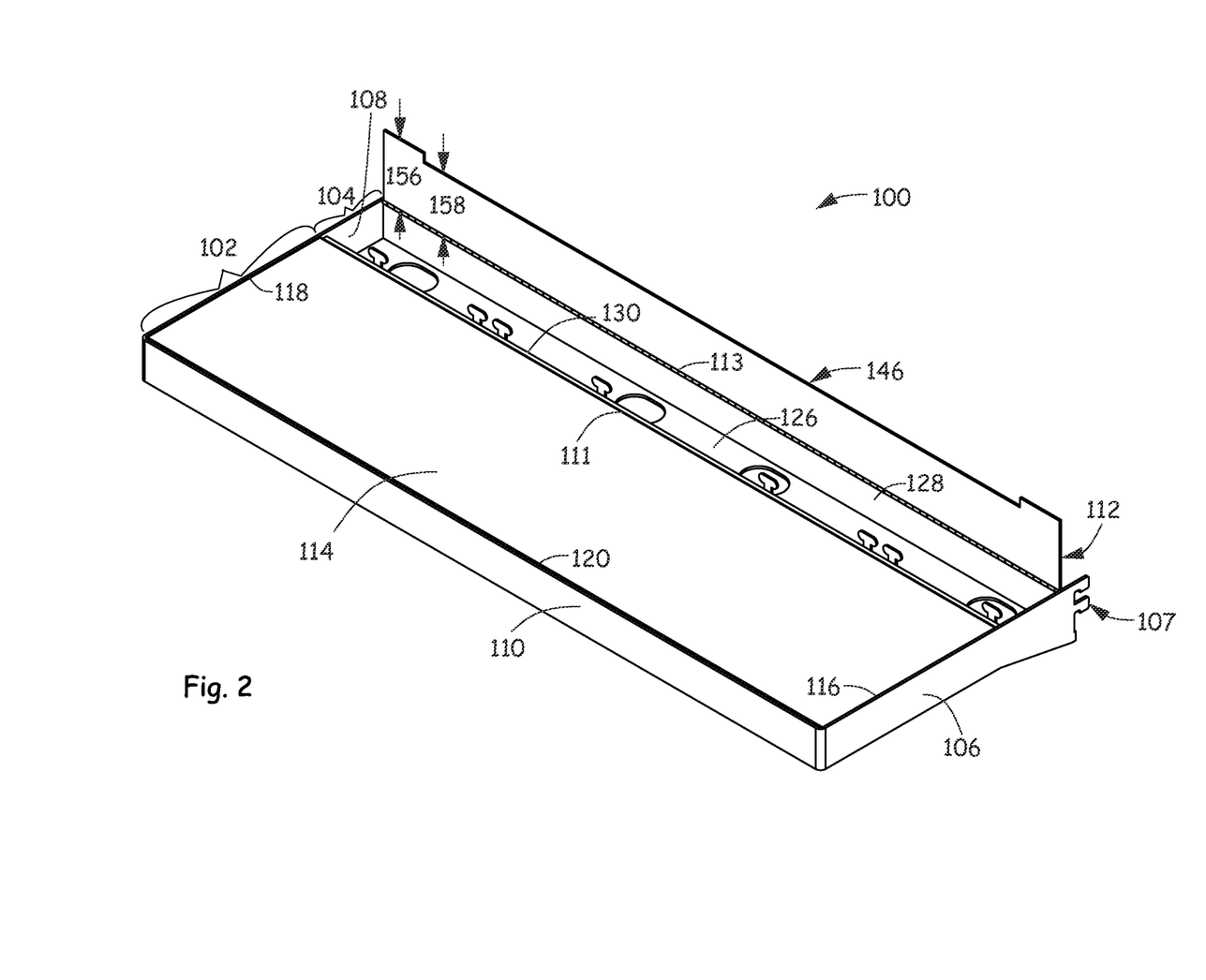
FIG. 2 is a perspective view of the display shelf where the door of the trough is in an opened position according to an alternate position of the embodiment illustrated in FIG. 1.
Figure 3:
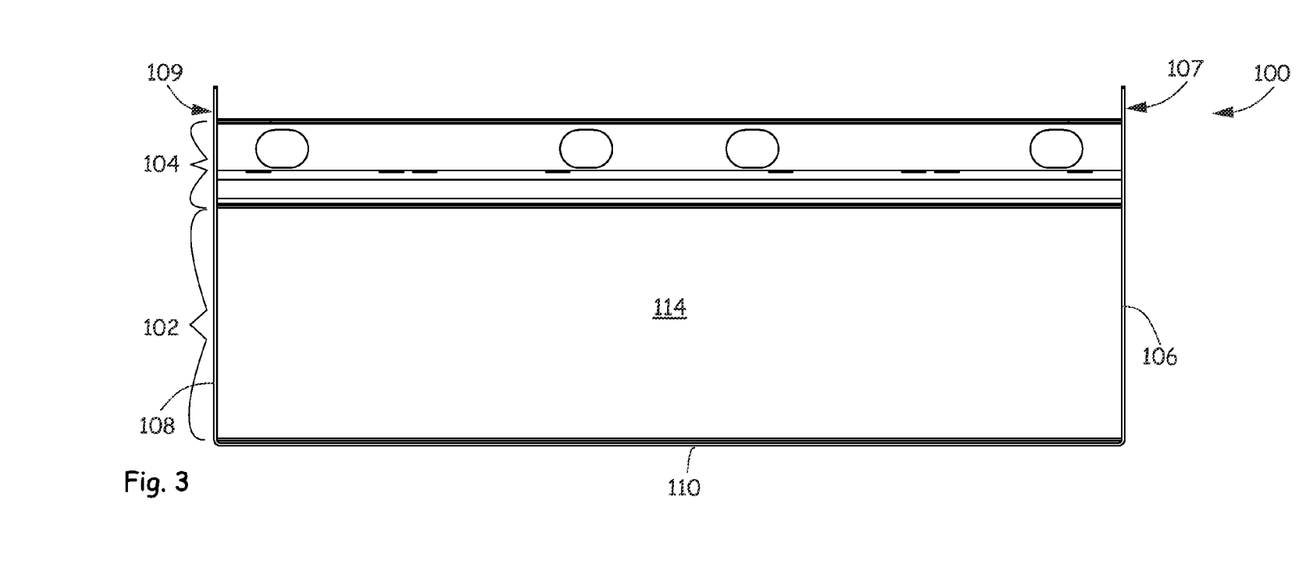
FIG. 3 is a top view of FIG. 2.
Figure 4:
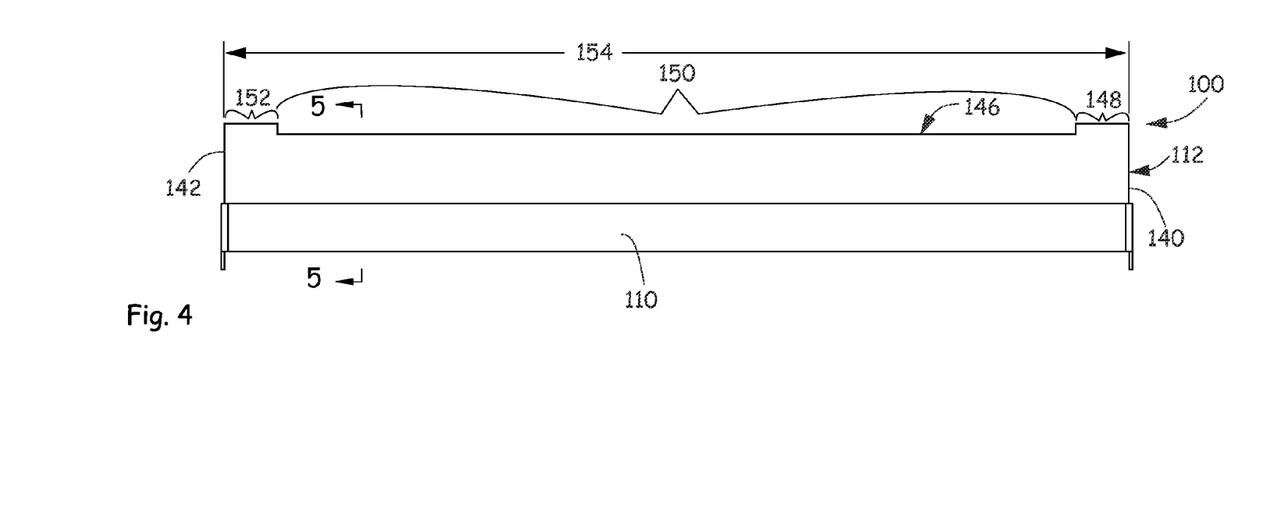
FIG. 4 is a front view of FIG. 2.
Figure 5:
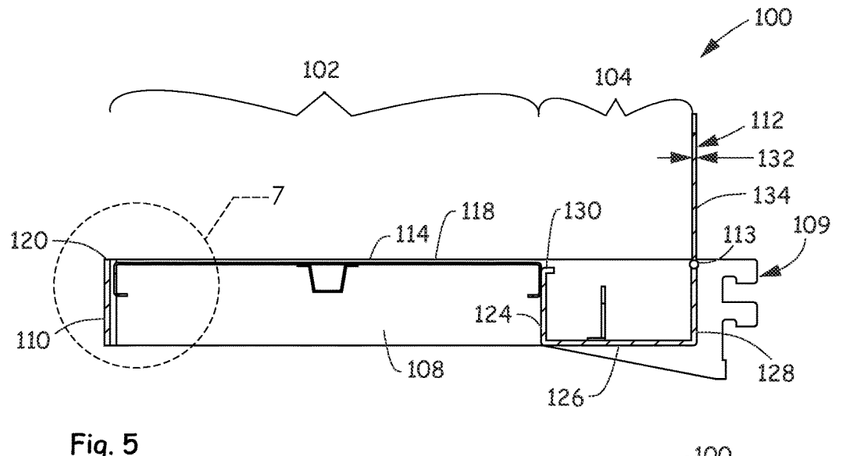
FIG. 5 is a section view of FIG. 2 taken through the line indicated in FIG. 4.
Figure 6:
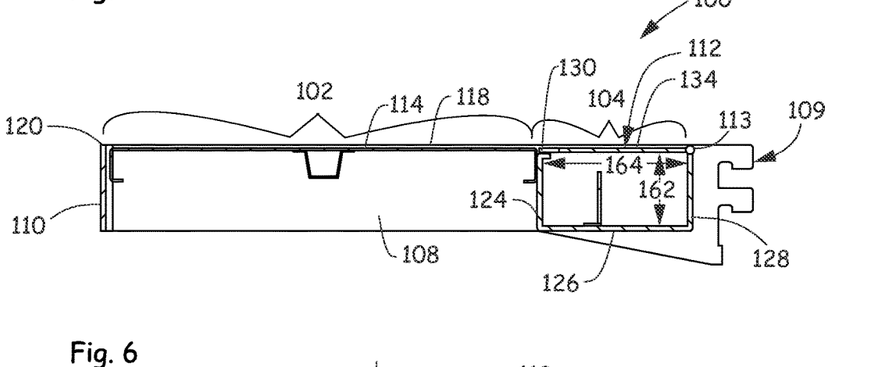
FIG. 6 is the section view shown in FIG. 5 with the door in a closed position.
Figure 7:
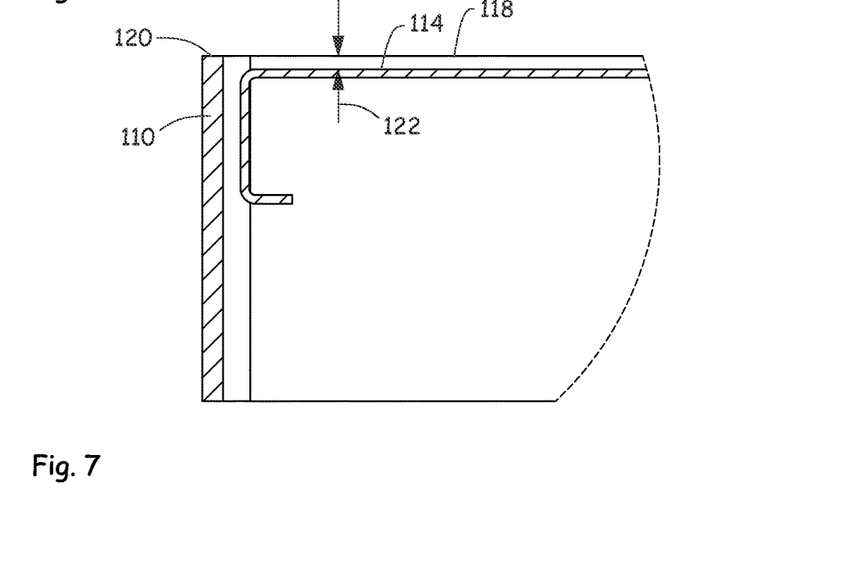
FIG. 7 is an enlarged view of a portion of FIG. 5.

FIG. 1 is a perspective view of a display shelf 100 attached to a portion of gondola display unit 101 according to one embodiment. Display shelf 100 includes a trough 104 and a door 112 in a closed position. FIG. 2 is a perspective view of display shelf 100 without the gondola display unit where door 112 is in an opened position according to an alternate position of the embodiment illustrated in FIG. 1. FIG. 3 is a top view of FIG. 2, FIG. 4 is a front view of FIG. 2, FIG. 5 is a section view of FIG. 2 taken through the line indicated in FIG. 4, FIG. 6 is the section view shown in FIG. 5 with door 112 in the closed position and FIG. 7 is an enlarged portion of the section view in FIG. 5. As illustrated, display shelf 100 is defined by a right and left panels 106 and 108 and further defined by a front panel 110. Right and left panels 106 and 108 each include rearward protruding fingers that form brackets 107 and 109, respectively, for insertion into slots 103 in the pair of uprights 105a and 105b of gondola display unit 101 so that display shelf 100 is supported by gondola display unit 101.

Display shelf 100 includes a table 102, a trough or pocket 104 and rotatable door 112. Table 102 is located at the front of display shelf 100 between front panel 110 and trough 104. As illustrated and discussed briefly above, trough 104 includes a front wall 124, a bottom wall 126 and a back wall 128. Trough or pocket 104 is located at the rear of the display shelf 100 between a back end 111 of table 102 and back wall 128. Therefore, front wall 124 of trough 104 is located behind table 102. Table 102 includes an upper surface 114 for displaying consumer products. As best illustrated in FIGS. 5, 6 and 7, upper surface 114 is recessed from upper edge 116 of right side panel 106, upper edge 118 of left side panel 108 and upper edge 120 of front panel 110 by a distance 122. Further, bottom wall 126 of trough 102 is located below upper surface 114 of table 102. Door 112 is rotatable about a hinge 113 that is coupled to a top of back wall 128 of trough 104. Rotatable door 112 is in a closed position in FIGS. 1 and 6 and in an opened position in FIGS. 2-5. Together, front wall 124, bottom wall 126, back wall 128 and door 112 define the interior space of trough or pocket 104.

As illustrated in FIG. 4, door 112 includes right and left side edges 140 and 142, a fixed edge 144 (FIG. 1) rotatably coupled to the top of back wall 128 of trough 104 by hinge 113, a free edge 146 and a top side 134 (FIG. 1). While free edge 146 is continuous, the entirety of free edge 146 does not remain linear along the same plane. Free edge 146 includes a first linear portion 148 that is linear along a plane, a second linear portion 150 that is linear along a plane that is different than the plane first linear portion 148 is linear along and a third linear portion 152 that is linear along the plane the first linear portion 148 is linear along. In this way, free edge 146 of door 112 has a single width 154 and two heights 156 and 158 (FIG. 2). Height 156 is defined between fixed edge 144 and first and third linear portions 148 and 152 and height 158 is defined between fixed edge 144 and second linear portion 150. In other words, free edge 146 includes first linear portion 148 spaced from fixed edge 144 by a first distance 156, second linear portion 150 spaced from fixed edge 144 by a second distance 158 that is less than first distance 156 and third linear portion 152 spaced from fixed edge 144 by first distance 156.

Cantilevered from or protruding from a top of front wall 124 of trough 104 in a direction pointing into the interior space of trough 104 is a lip 130 that runs along the entirety of front wall 124 of trough 104 and therefore the entirety of back end 111 of table 102. As illustrated in FIGS. 5 and 6, the top of front wall 124 of trough 104 and therefore lip 130 is slightly lower than upper surface 114 to accommodate for a thickness 132 of door 112. As such, when door 112 is in the closed position, first linear portion 148 and third linear portion 152 of free edge 146 rests on lip 130 so that top side 134 of door 112 is in alignment with upper surface 114 of table 102 as shown in FIG. 6. In this way, upper surface 114 of table 102 and top side 134 of door 112 (when in the closed position) appear to be made of a single surface that includes an elongated slot when in actuality the elongated slot is defined between second linear portion 150 of free edge 146 of door 112 and back end 111 of table 102. This elongated slot receives a power cord from at least one electrically powered consumer product that is being displayed on table 102 in front of the elongated slot.

Figure 8:
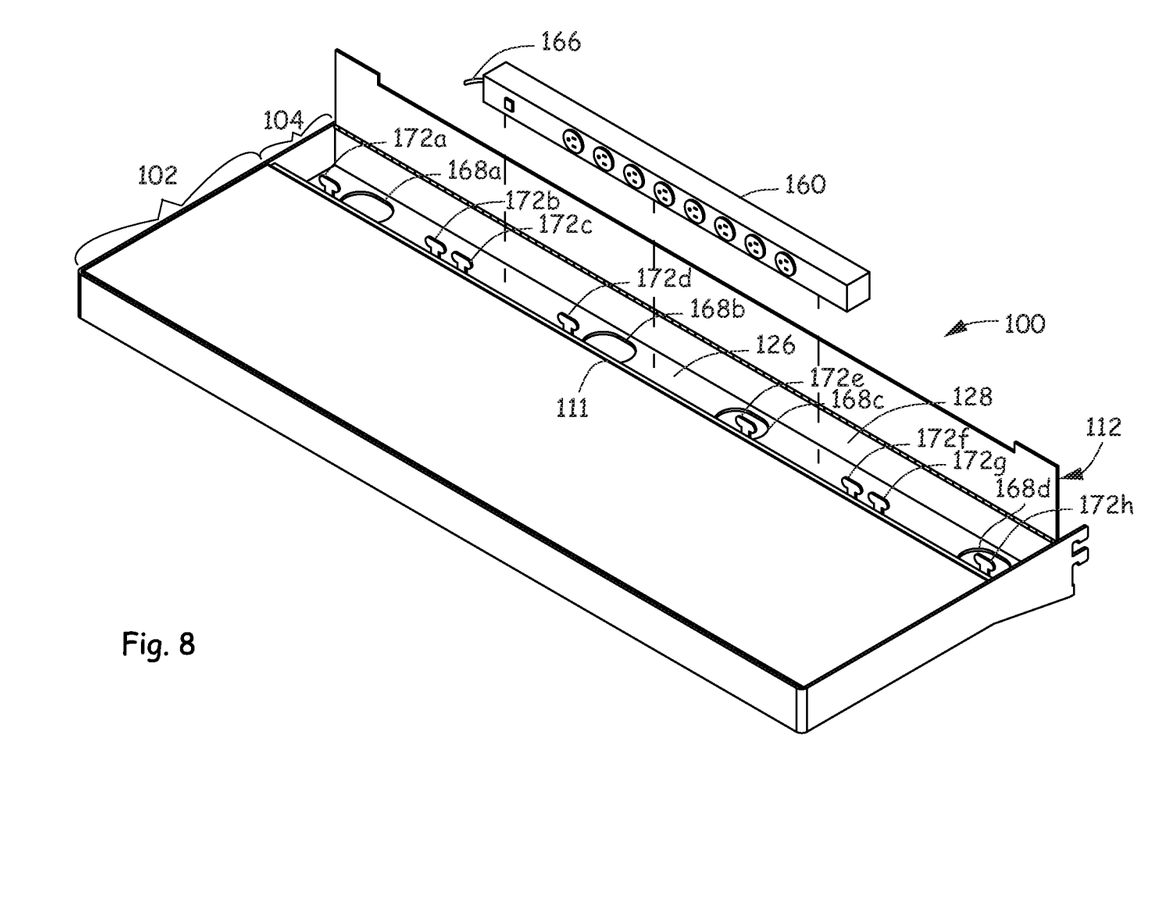
FIG. 8 illustrates the display shelf of FIG. 2 with an exploded power strip.

As illustrated in FIG. 8, display shelf 100 includes a power strip 160. Power strip 160 is located in trough 104 and in FIG. 8 is exploded from trough 104. With reference back to FIG. 6, trough 104 includes a height 162 as defined between door 112 in the closed position and bottom wall 126 and a depth 164 as defined between front wall 124 and back wall 128. Fitted within height 162 and depth 164 of trough 104 is power strip 160 with at least one socket for receiving an electrical plug on the electrically powered consumer product being displayed on table 102. Power strip 160 further includes a power cord 166 that runs from power strip 160 and through one of a plurality of holes 168a, 168b, 168c and 168d in bottom wall 126 of trough 104 to a power source, which in one embodiment is located behind a wall of gondola display unit 101.

Figure 9:
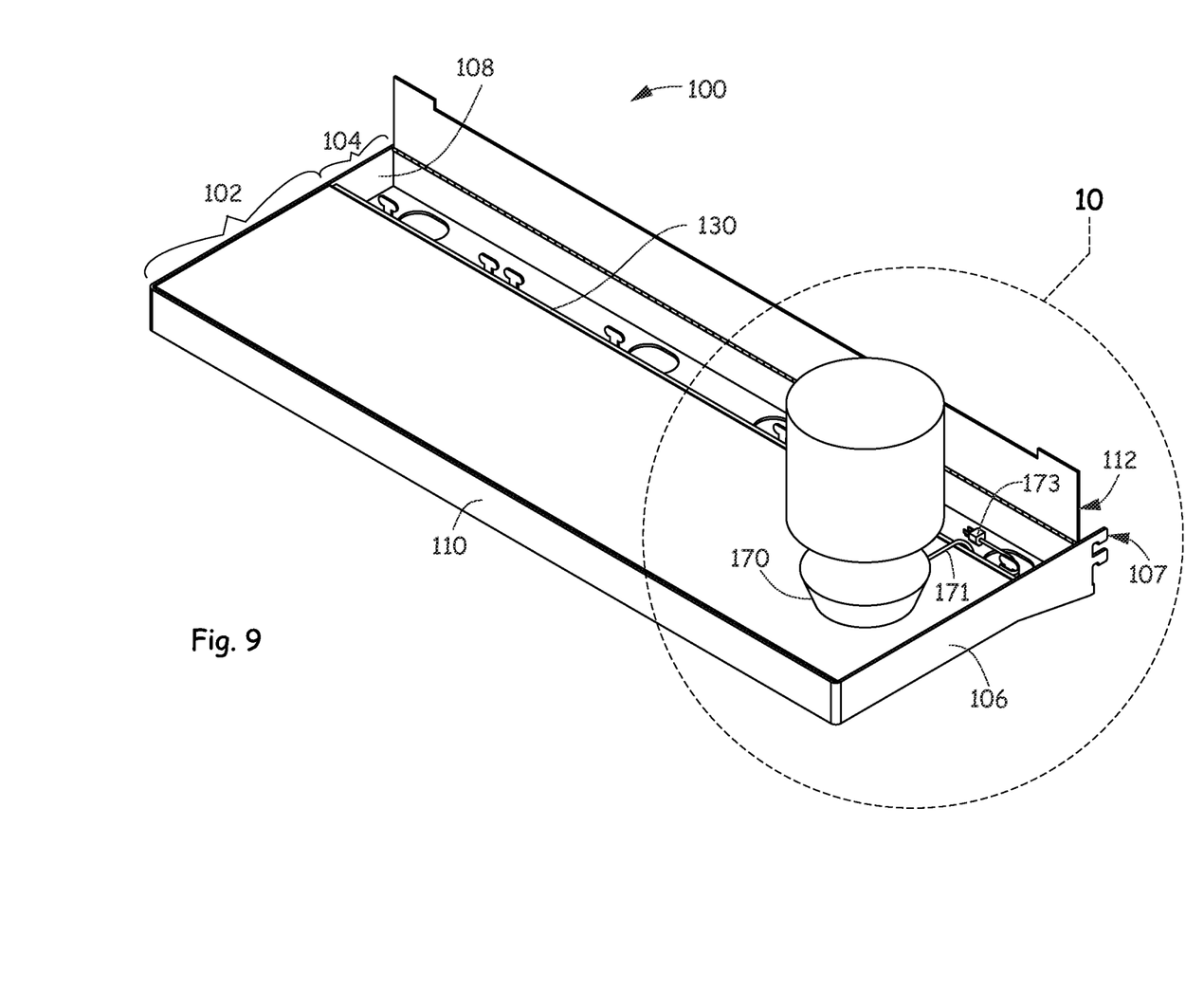
FIG. 9 illustrates the display shelf of FIG. 2 with an electrically powered consumer product being displayed on the display shelf according to one embodiment.
Figure 10:
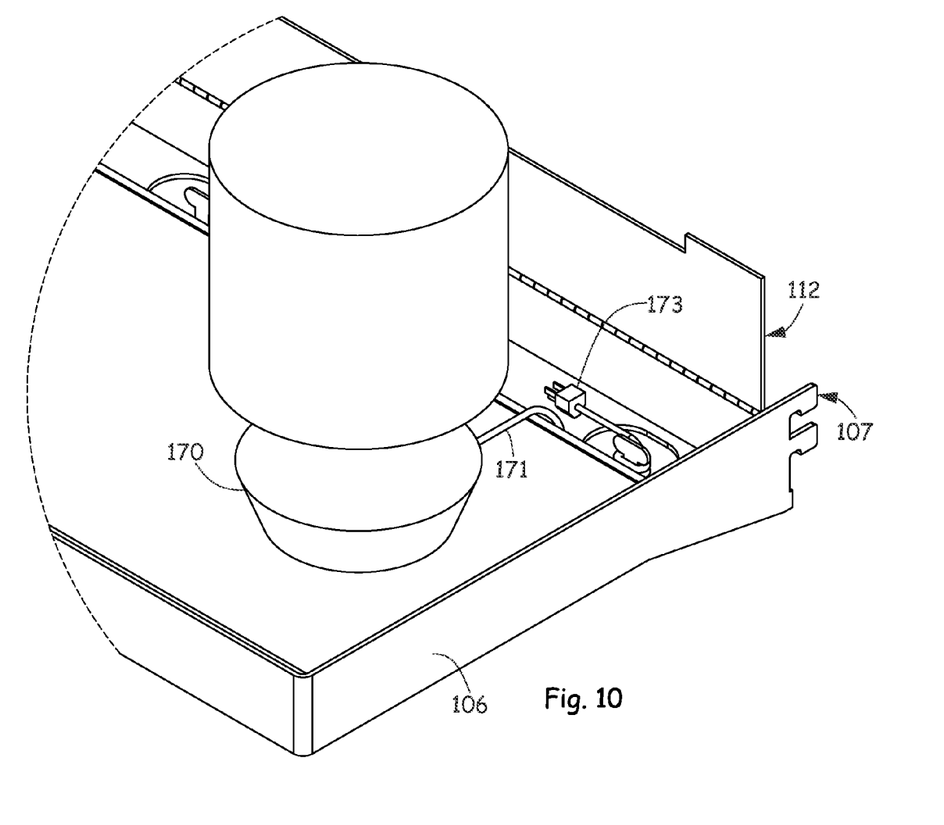
FIG. 10 is an enlarged view of a portion of FIG. 9.
Figure 11:
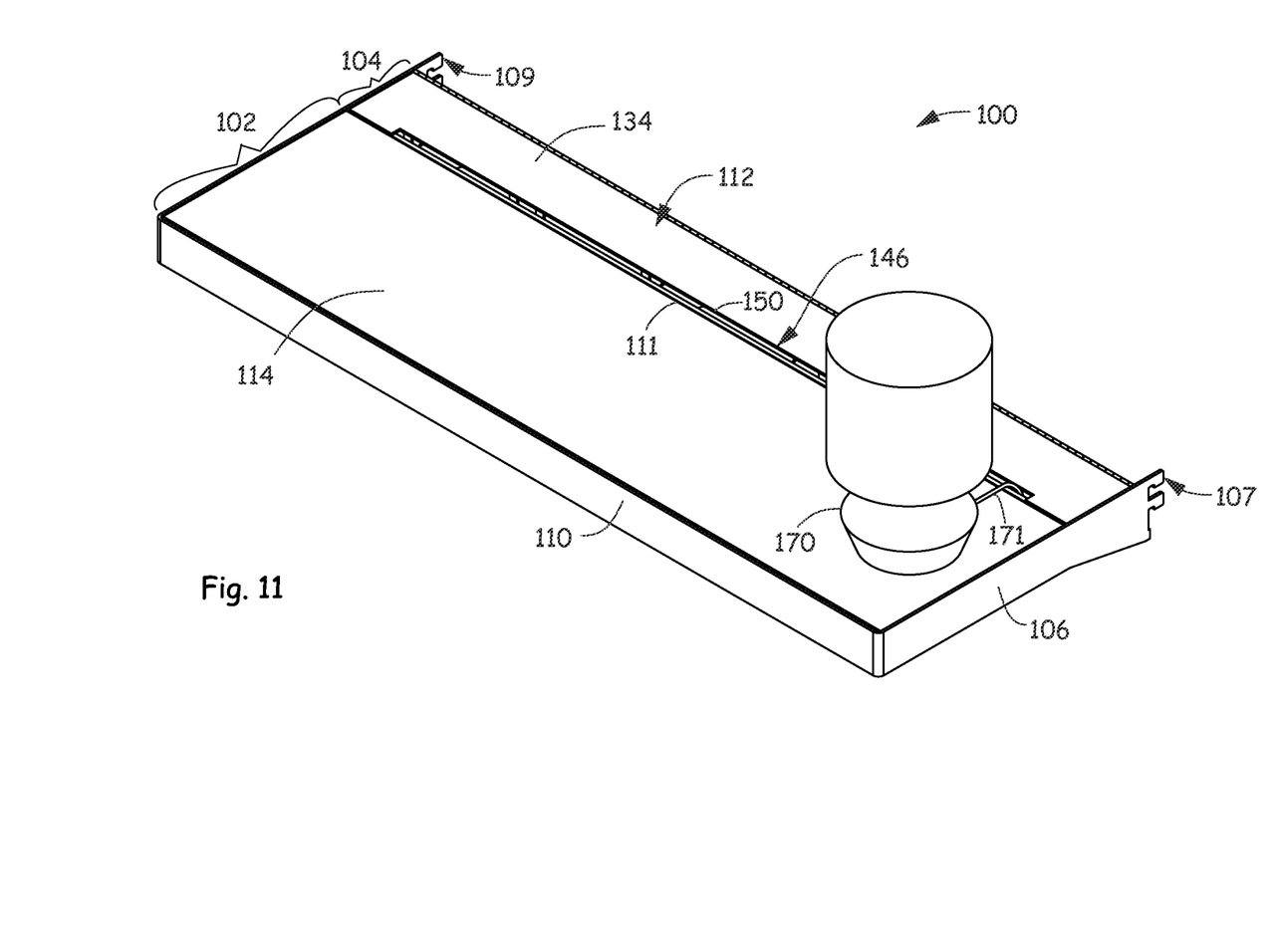
FIG. 11 is a perspective view of FIG. 1 displaying an electrically powered consumer product according to one embodiment.

FIG. 9 illustrates display shelf 100 as shown in FIG. 2 where door 112 is in the opened position and an electrically powered consumer product 170, such as a lamp, is displayed on table 102. It should be realized that more than one electrically powered consumer product 170 can be displayed on table 102. FIG. 10 is an enlarged view of a portion of FIG. 9 and FIG. 11 illustrates display shelf 100 as shown in FIG. 9, but where door 112 is in the closed position. Trough 104 includes a plurality of cord winders 172a-h. Cord winders 172a-h include proximal ends and distal ends and protrude from bottom wall 126 of trough 102 into the interior space of trough 104. Although not particularly shown, each electrically powered consumer product 170 displayed on display shelf 100 is plugged into a socket of power strip 160. If the length of a consumer product cord 171 of electrically powered consumer product 170 is too long, excess length of the cord is wound around one of the cord winders 172a-h and supported by cord winders 172a-h as is shown in FIGS. 9 and 10. Distal ends of cord winders 172a-h are thicker than proximal ends of cord winders 172a-h so that the excess cord remains situated on cord winders 172a-h without slipping off. FIG. 11 illustrates how by placing door 112 in the closed position, the management of product cords and the power strip are hidden from view and top surface 134 of door 112 appears to be a part of upper surface 114 of table 102. In particular, product cord 171 travels through the elongated slot defined between the second linear portion 150 of free edge 146 and back 111 of table 102.

Also disclosed is a method of displaying electrically powered consumer products. The method includes setting at least one electrically powered consumer product 170, such as a lamp, on upper surface 114 of table 102 on display shelf 100. See FIGS. 9 and 10. Electrically powered consumer product 170 includes a power cord 171 with an electrical plug 173. Although not specifically illustrated, electrical plug 173 is plugged into power strip 160 (FIG. 8), which is located within the interior space of trough 104 and behind table 102. In particular, power strip 160 rests on bottom wall 126 and is located between front wall 124 and back wall 128 and between right and left side panels 106 and 108 of shelf 100. As previously mentioned, bottom wall 126 is located below upper surface 114 of table 102 so that power strip 160 is also located below upper surface 114 of table 102. The excess length of cord 171 is then wrapped around one of cord winder 172a-h if needed so that the power cords do not bunch inside trough 104 or too much of the length of the cord is located outside of trough 104.

Rotatable door 112 is then shut or rotated about hinge 113 and closed so that the interior space of trough 104 is covered and hidden from view. In particular, power strip 160, a portion of the power cord 171 and its plug 173 are hidden from view and do not detract from the consumer product or products being displayed on table 102. In the closed position, portions 148 and 152 of free edge 146 engage with lip 130 that protrudes from front wall 124 of trough 104 so that top side 134 of door 112 is in alignment with upper surface 114 of table 102 and a remaining portion 150 of free edge 146 defines an elongated slot. When performing this operation, a user can shut or close the door by placing their fingers on the elongated slot. This way, a user's fingers will not get pinched when the portions 148 and 152 are rested on lip 130.

Passing through the elongated slot into trough 104 is power cord 171 for electrically powered consumer product 170. Power strip 160 also includes a power cord 166. Power cord 166 is threaded through one of the holes 168a-d in bottom wall 126 of trough 104 to couple to a power source. To finish the display, electrically powered consumer product 170 is switched on.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A display shelf comprising:
   a table having an upper surface for displaying at least one electrically powered consumer product and a back end;
   a trough that extends along an entire length of the table and having a front wall, a bottom wall and a back wall and being defined between the back end of the table and the back wall of the trough, wherein the bottom wall of the trough is located below the upper surface of the table;
   a door that extends an entire length of the trough and having right and left side edges, a fixed edge rotatably coupled to a top of the back wall of the trough, a front free edge and a top side, wherein the front free edge includes a first linear portion spaced from the fixed edge by a first distance, a second linear portion spaced from the fixed edge by a second distance that is less than the first distance and a third linear portion spaced from the fixed edge by the first distance and wherein the second linear portion is located between the first and third linear portions; and
   a lip protruding from the front wall of the trough in a direction away from the table and engaging with the front free edge of the door along the first linear portion and the third linear portion when the door is in a closed position, wherein the top side of the door is in alignment with the upper surface of the table when the door is in the closed position so that between the back end of the table and the second linear portion of the free edge of the door forms an elongated slot in the display shelf for receiving a power cord from the at least one electrically powered consumer product displayed on the table;
   wherein the second linear portion that forms the elongated slot includes a length that is greater than lengths of both the first and third linear portions.

2. The display shelf of claim 1, wherein the trough further comprises a plurality of cord winders protruding from the bottom wall of the trough and extending into an interior space of the trough, the cord winders configured to support excess length of the at least one power cord of the at least one electrically powered consumer product.

3. The display shelf of claim 1, further comprising a power strip having at least one socket for receiving an electrical plug on the power cord of the at least one electrically powered consumer product, wherein the power strip further includes a power cord that passes through at least one hole in the bottom wall of the pocket.

4. The display shelf of claim 1, wherein the rotatable door is rotatable about a hinge that is coupled to a top of the back wall of the trough.

5. The display shelf of claim 1, wherein the table and the trough are defined between right and left side panels that have rearward mounting brackets and a front panel that is located between the right and left side panels.

6. The display shelf of claim 5, wherein the upper surface of the table is recessed below upper edges of the right and left side panels and an upper edge of the front panel by a distance.

7. The display shelf of claim 1, wherein the lip runs along an entirety of the front wall of the trough.

8. A method of displaying electrically powered consumer products, the method comprising:
   setting at least one electrically powered consumer product on an upper surface of a table of a display shelf, wherein the at least one electrically powered consumer product includes a power cord;
   plugging the power cord of the at least one electrically powered consumer product into a power strip located in a trough located behind the table and extending along an entire length of the table, wherein the trough is defined by a front wall, a bottom wall and a back wall and wherein the bottom wall of the trough is located below the upper surface of the table; and
   shutting a rotatable door that extends an entire length of the trough and covers the trough, wherein portions of a front free edge of the rotatable door are adjacent to a back end of the table and engage with a lip that protrudes from the front wall of the trough in a direction away from the table so that a top side of the rotatable door is in alignment with the upper surface of the table and wherein a remaining portion of the front free edge of the rotatable door is spaced apart from the back end of the table and defines an elongated slot for the power cord to pass into the trough, the elongated slot having a length that is greater than a combined length of the portions of the front free edge of the rotatable door that are adjacent to the back end of the table.

9. The method of claim 8, further comprising wrapping excess length of the power cord of the at least one electrically powered consumer product around a cord winder that protrudes from the bottom wall of the trough.

10. The method of claim 8, further comprising threading a power cord on the power strip through a hole in the bottom wall of the trough to couple to a power source.

11. The method of claim 8, further comprising switching the electrically powered consumer product on.

12. The method of claim 8, wherein the lip runs along the entirety of the front wall of the trough.

13. A display shelf comprising:
a table having a back end and an upper surface configured to support at least one electrically powered consumer product;
a pocket that extends along an entire length of the table and has a front wall and a lip, wherein the front wall abuts the back end of the table and wherein the lip protrudes from the front wall in a direction away from the back end of the table; and
a rotatable door that covers the pocket in a closed position and has a top side and a front free edge that extends an entire length of the pocket;
wherein a portion of the front free edge of the rotatable door and the back end of the table are spaced apart from each other by a distance great enough so as to be configured to receive a thickness of a power cord of the at least one electrically powered consumer product being displayed on the upper surface of the table and form a single elongated slot when the rotatable door is in the closed position;
wherein remaining portions of the front free edge of the rotatable door rest on the lip that protrudes from the front wall of the pocket when in the closed position so that the remaining portions of the front free edge of the rotatable door are adjacent to the back end of the table and the top side of the rotatable door is in alignment with the upper surface of the table; and
wherein the single elongated slot has a length that is greater than lengths of the remaining portions.

14. The display shelf of claim 13, wherein the pocket is defined by the front wall, a bottom wall and a back wall, the bottom wall of the pocket being located below the upper surface of the table and the front wall of the pocket being located behind the table.

15. The display shelf of claim 14, wherein the pocket further comprises a plurality of cord winders protruding from the bottom wall of the pocket and extending into an interior space of the pocket, the cord winders configured to support excess length of the power cord of the at least one electrically powered consumer product.

16. The display shelf of claim 14, further comprising a power strip having at least one socket for receiving an electrical plug on the at least one power cord of the at least one electrically powered consumer product, wherein the power strip further includes a power cord that passes through at least one hole in the bottom wall of the pocket.

17. The display shelf of claim 14, wherein the rotatable door is rotatable about a hinge that is coupled to a top of the back wall of the pocket.

18. The display shelf of claim 13, wherein the portion of the free edge of the rotatable door that forms the elongated slot extends linearly along a plane.

19. The display shelf of claim 13, wherein the table and the pocket located behind the table are defined between right and left side panels that have rearward mounting brackets and a front panel that is located between the right and left side panels.

20. The display shelf of claim 13, wherein the lip runs along an entirety of the front wall of the pocket.

* * * * *